A. J. ROBINSON.
WATER-WHEEL.

No. 181,720.  Patented Aug. 29, 1876.

Witnesses:  Inventor;
J. S. Elliott  Aaron J. Robinson
H. E. Bathrick  per Edw. Dummer
  Atty.

UNITED STATES PATENT OFFICE.

AARON J. ROBINSON, OF FREMONT, NEW HAMPSHIRE.

IMPROVEMENT IN WATER-WHEELS.

Specification forming part of Letters Patent No. 181,720, dated August 29, 1876; application filed March 4, 1876.

*To all whom it may concern:*

Be it known that I, AARON JOSIAH ROBINSON, of Fremont, in the county of Rockingham and State of New Hampshire, have invented a new and useful Improvement in Water-Wheels, which improvement is fully set forth in the following specification, reference being had to the accompanying drawings.

My invention consists, first, in regulating the quantity of water admitted to a water-wheel by moving the wheel itself in the direction of the length of its shaft; secondly, in so constructing an outwardly-discharging water-wheel and connecting parts that the pressure of the water within the wheel shall sustain the weight of the wheel, and that the wheel may be raised or lowered by a screw or equivalent device, against which the wheel presses counter to the pressure of the water aforesaid; thirdly, in so constructing and locating the guides which direct the water to the buckets of a water-wheel that they may be raised or lowered at the same time with the wheel, but independently of it, by the pressure of the water or other means; fourthly, in a water-wheel which has both an outwardly horizontal and downward discharge; fifthly, in other parts and attachments in combination, as hereinafter described.

Figure 1:
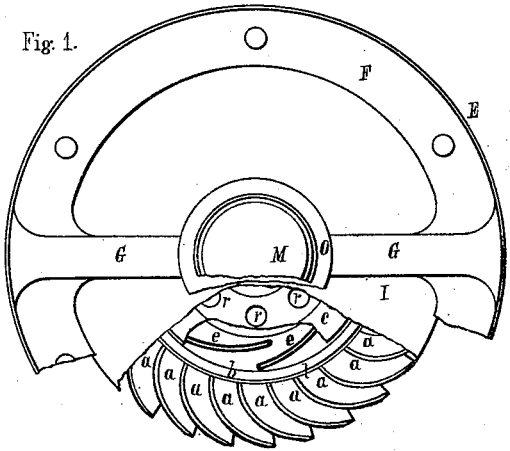
Figure 2:
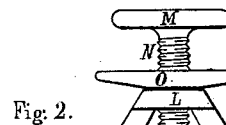

In the drawings, Figure 1 is a plan view of my water-wheel and supporting-frame, parts being broken away for better illustration. Fig. 2 is a side elevation of wheel and frame of Fig. 1, one half of wheel and parts about the same being in section.

The water-wheel represented receives the water internally and from below, A being the flange of a pipe conducting the water to the wheel, or a portion of a flume, on which the wheel may rest. To the flange or flume A is bolted the flange B, which is solidly connected to the cylinder C. The frame for supporting the shaft and adjoining parts, as here shown, consists of the uprights D, which are secured to the outside of flange B and cylinder C, at their lower ends, and to the annular plate E at their upper ends; also, of the annular plate F, which is bolted to the plate E, and has secured to it the inclined supports G, united at the top and farther down by the cross-pieces L and H, as shown. When the whole is made of metal the frame described for supporting shaft is very suitable; but the shaft may be held by beams or timbers when, for various reasons, it may be desirable. The wheel consists mainly of the plate or disk I, convex on the upper and concave on the under side, having, as one piece with it, the hub $d$, and the buckets $a$ firmly connected at their upper edges to the under side of the rim of the plate I, and further held in place by the ring $b$, which, with the buckets when moved down, are outside of the cylinder C. These parts of the wheel may all be cast in one piece, or be otherwise suitably joined, as may be required by the size or perfectness of the wheel. The buckets $a$, formed in general as shown, should be of the proper curve to gain the greatest effect. Within the wheel is the guide plate or disk $c$, having the hub $p$, and having firmly fastened to the under side of the rim of the plate the guides $e$. The hub $p$ carries the step $f$ for the wheel, and also an extension or shaft, $g$, which, passing through the cross-piece $h$ extending from side to side, in the inside of the cylinder C, maintains the guide-plate $c$ in its horizontal position, and hence the guides $e$ in their vertical position. Near the top edge of the cylinder C is fastened thereto, on the inside, the annular ring or plate $i$, which has curved slots, through which the guides $e$ may slide vertically, and which acts as the bottom to the shoots inclosed by the guides $e$. The wheel-shaft $k$ is formed at the lower end to fit the step $f$, and, being firmly secured in the hub $d$, passes through the cross-piece H. Through the cross-piece L is screwed, by the hand-wheel M, the screw N, which may be bound by the check-nut and hand-wheel O. The screw N carries a step, $j$, to which the upper end of the shaft $k$ is fitted. On the shaft $k$ is splined the gear S, or pulley, when a belt is used for transmitting the power, so that the shaft may slide up and down therein, the gear or pulley being held in the cross-piece H, as shown.

The water, entering the cylinder C from below, passes upward and fills all the space below the guide-plate $c$. Openings $r$ are made in the guide-plate $c$, so that water may also enter between the guide-plate $c$ and plate I of the wheel. The pressure of the water will therefore, be exerted against the under side of the plate I, carrying the wheel and shaft upward as far as the position of the screw N and step $j$ will allow. The water will also press against the under side of the guide-plate $c$, since the upper side of the guide-plate $c$ and under side of the wheel-plate I are so formed, as at $l$, that the egress of water at the outer rim of these plates will be more free than the ingress. This pressure against the under side of the guide-plate will be sufficient to carry the guide-plate and guides $e$ upward as far as the shaft $k$ pressing on the step $f$ will allow. The water, then flowing through the chutes formed by the rim of the guide-plate $c$, the guides $e$, and annular plate $i$, will strike that portion of the buckets $a$ exposed above the upper edge of the cylinder C. The amount of this exposure will be regulated, as well as the position of the guide-plate $c$, by adjusting the screw N. The buckets of the wheel discharge externally both horizontally and downward, they being open at the side and bottom, as shown, and are so formed as to give the best effect in the manner of discharge specified. There are openings $o$ in the top of the wheel, closed by suitable caps, for convenience in removing any obstruction within the wheel or adjusting the step.

In some cases it may be desirable to raise and lower the wheel and guides, one or both, directly by means of a lever or screw, and not depend on the pressure of the water, and also to have the wheel slide on the shaft, the latter not moving longitudinally, in which cases, in regulating the amount of water used by moving the wheel, or causing a water-wheel to act as its own gate, my invention would be involved.

I have described my water-wheel as used horizontally, its shaft being vertical; but in some cases it may be desirable to have the wheel vertical, the shaft being horizontal, in which cases the description given herein should be regarded as giving the relative position of parts.

I claim as my invention—

1. A water-wheel having its buckets rigidly fixed to the plate or body of the wheel, which is moved in the direction of the length of its shaft to regulate the amount of water received by its buckets, substantially as hereinbefore described.

2. In combination with a water-wheel, constructed and adjusted to act as its own gate, substantially as hereinbefore described, guides $e$ and their supporting frame or plate $c$, moved in the same direction with that of the wheel, substantially as and for the purpose hereinbefore set forth.

3. A water-wheel, having a step, $j$, at the upper or outer end of its shaft, as a counter stop or pressure to the pressure of the water, the position of said stop being regulated by a screw, N, substantially as hereinbefore specified.

4. The combination of the guide-plate $c$, guides $e$, annular plate $i$, and cylinder C, substantially as hereinbefore described.

5. A water-wheel having one or more hand-holes, $o$, located substantially as hereinbefore shown and described.

6. A water-wheel which receives the water internally and discharges externally in both a horizontal and vertically-downward direction or a horizontal and vertically-upward direction, according to the position of the wheel, substantially as hereinbefore set forth.

AARON JOSIAH ROBINSON.

Witnesses:
JOSIAH B. ROBINSON,
PERLEY ROBINSON.